US012701270B2

(12) United States Patent
Han et al.

(10) Patent No.: US 12,701,270 B2
(45) Date of Patent: Aug. 4, 2026

(54) REGULARIZATION OF A PROBABILITY MODEL FOR ENTROPY CODING

(71) Applicant: GOOGLE LLC, Mountain View, CA (US)

(72) Inventors: Jingning Han, Santa Clara, CA (US); Yaowu Xu, Saratoga, CA (US); Joseph Young, Mountain View, CA (US); In Suk Chong, Mountain View, CA (US); Debargha Mukherjee, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/836,986

(22) PCT Filed: Dec. 29, 2022

(86) PCT No.: PCT/US2022/082589
§ 371 (c)(1),
(2) Date: Aug. 8, 2024

(87) PCT Pub. No.: WO2023/163808
PCT Pub. Date: Aug. 31, 2023

(65) Prior Publication Data
US 2025/0150641 A1 May 8, 2025

Related U.S. Application Data

(60) Provisional application No. 63/354,284, filed on Jun. 22, 2022, provisional application No. 63/312,830, filed on Feb. 22, 2022.

(51) Int. Cl.
*H04N 19/91* (2014.01)
*H04N 19/18* (2014.01)
*H04N 19/70* (2014.01)

(52) U.S. Cl.
CPC ............. *H04N 19/91* (2014.11); *H04N 19/18* (2014.11); *H04N 19/70* (2014.11)

(58) Field of Classification Search
CPC ............. H03M 7/3079; H03M 7/4018; H04N 19/184; H04N 19/13
See application file for complete search history.

(56) References Cited

U.S. PATENT DOCUMENTS

| | | | | | |
|---|---|---|---|---|---|
| 2012/0147948 | A1* | 6/2012 | Sole | ....................... | H04N 19/42 375/E7.027 |
| 2012/0328026 | A1* | 12/2012 | Sole Rojals | ........... | H04N 19/13 375/240.18 |

(Continued)

FOREIGN PATENT DOCUMENTS

| | | |
|---|---|---|
| EP | 2467941 B1 | 10/2015 |
| EP | 3206399 A1 | 8/2017 |
| WO | 2019/216324 A1 | 11/2019 |

OTHER PUBLICATIONS

Rivaz et al. "Av1 bitstream & decoding process specification." The Alliance for Open Media 1 (Year: 2019).*

(Continued)

*Primary Examiner* — Fabio S Lima
(74) *Attorney, Agent, or Firm* — Young Basile Hanlon & MacFarlane. P.C.

(57) ABSTRACT

Entropy coding a sequence of syntax elements is described where an observation for a syntax element of the sequence is determined, and the observation is arithmetic coded using the probability model. Thereafter, the probability model is updated using a time-variant update rate to produce an updated probability model. Updating the probability model includes regularizing one or more probability values of the probability model so no probability of the updated probability model is below a defined minimum resolution. As a result, the use of a minimum probability value during the (Continued)

arithmetic coding, which can distort probability model, may be omitted.

19 Claims, 7 Drawing Sheets

(56)　　　　　　　References Cited

U.S. PATENT DOCUMENTS

| | | | | |
|---|---|---|---|---|
| 2016/0248440 | A1* | 8/2016 | Greenfield | H03M 7/30 |
| 2018/0324435 | A1* | 11/2018 | George | H04N 19/52 |
| 2019/0068970 | A1* | 2/2019 | He | H04N 19/124 |
| 2020/0213599 | A1* | 7/2020 | Young | H04N 19/18 |
| 2020/0252656 | A1 | 8/2020 | Xu et al. | |
| 2021/0144381 | A1 | 5/2021 | Bossen | |
| 2023/0247206 | A1 | 8/2023 | Peringassery Krishnan et al. | |

OTHER PUBLICATIONS

International Search Report and Written Opinion of International Application No. PCT/US2022/082589 dated May 25, 2023; 23 pages.

T. Terriberry et al., "Coding Tools for a Next Generation Video Codec", Internet Engineering Task Force (IETF), Standworkingdraft, Internet Society, dated Oct. 31, 2016 (Geneva, Switzerland, Nov. 1, 2016), 24 pgs.

Jingning Han et al., "A Technical Overview of AV1", Proceedings of the IEEE, IEEE, New York, vol. 109, No. 9, Sep. 2021, pp. 1435-1462.

Jingning Han et al., "Probability Model Estimation for M-Ary Random Variables", 2022 IEEE International Conference on Image Processing (ICIP), IEEE, Oct. 16, 2022, pp. 3021-3025.

International Search Report and Written Opinion of International Application No. PCT/US2022/082581, mailed May 26, 2023, 22 pgs.

X. Xiu et al., "AHG12: Improved probability estimation for CABAC", Joint Video Experts Team (JVET) of ITU-T SG 16 WP 3 and ISO/IEC JTC 1/SC 29, 25 Meeting, Jan. 12-21, 2022, Document: JVET-Y0157, 4 pgs.

A. Said et al. "Arithmetic coding with context-dependent double-window adaptation response", Joint Video Exploration Team (JVET) of ITU-T SG 16 WP 3 and ISO/IEC JTC 1/SC 29/WG 11, 7th Meeting (Torino, Italy), Jul. 13-21, 2017, Document: JVET-G0112, 4 pgs.

* cited by examiner

700

CURRENT BLOCK

720

TRANSFORM BLOCK 708     710     704     728

ZIG-ZAG ORDER

702

NON-ZERO MAP 718     720     706

EOB MAP     722     724     SIGN MAP     726

800

REGULARIZATION OF A PROBABILITY MODEL FOR ENTROPY CODING

CROSS-REFERENCE TO RELATED APPLICATIONS

This application is a National Stage Entry of International Application No. PCT/US2022/082589, filed Dec. 29, 2022, which claims priority to and the benefit of U.S. Provisional Patent Application No. 63/312,830, filed Feb. 22, 2022, and U.S. Provisional Patent Application No. 63/354,284, filed Jun. 22, 2022, each of which is incorporated herein in its entirety by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including lossy and lossless compression techniques. Lossless compression techniques include entropy coding.

SUMMARY

Probability estimation is used for entropy coding, particularly with context-based entropy coding for lossless compression. Efficiency of the entropy coding depends on the accuracy of the probability model, including its update process. Approaches to improve probability model accuracy are described herein.

The teachings herein describe different methods and apparatus for entropy coding a sequence of syntax elements that include regularizing a probability model for entropy coding, using different time-variant update rates for a multi-hypothesis probability model, and combinations thereof.

An aspect of the teachings herein includes a method for entropy coding a sequence of syntax elements. The method can include receiving the sequence of syntax elements, determining a symbol for a syntax element of the sequence, entropy coding, using arithmetic coding, the symbol using a probability model, and updating the probability model using a time-variant update rate to produce an updated probability model, wherein updating the probability model includes regularizing one or more probability values so no probability of the updated probability model is below a defined minimum resolution.

In some implementations of the method, the probability model comprises a cumulative distribution function of an M-ary random variable, wherein M is is a positive integer that represents a cardinality of possible observations for a respective syntax element of the sequence of syntax elements.

In some implementations of the method, regularizing the one or more probability values modifies every probability of the updated probability model after performing an update step on the probability model. In some variations of these implementations, regularizing the one or more probability values uses a lowest probability of the updated probability model as input.

In some implementations of the method, the probability model comprises a cumulative distribution function of an M-ary random variable, M is a positive integer that represents a cardinality of possible observations for a respective syntax element of the sequence of syntax elements, and regularizing the one or more probability values comprises applying a uniform cumulative distribution function for the M-ary random variable to the updated probability model.

In some implementations of the method, the defined minimum resolution is 1/M.

In some implementations of the method, regularizing the one or more probability values modifies every probability of the probability model while updating the probability model using the time-variant update rate. In some variations of these implementations, the time-variant update rate includes a regularization term added to or subtracted each probability of the probability model.

In some implementations of the method, the probability model is a cumulative distribution model (CDF), and updating the one or more probability values comprises adding to or subtracting from each probability of the CDF a regularization term.

In some implementations of the method, entropy coding the observation comprises entropy coding the observation without checking for a minimum probability value.

In some implementations of the method, the sequence of syntax elements comprises encoded transform coefficients, and entropy coding the symbol comprises entropy decoding a transform coefficient.

In some implementations of the method, the sequence of syntax elements comprises transform coefficients, and entropy coding the symbol comprises entropy encoding a transform coefficient.

In some implementations of the method, the probability model comprises a first probability model and a second probability model, entropy coding the symbol using a probability model comprises coding the observation using a linear combination of the first probability model and the second probability model, and updating the probability model comprises updating the first probability model using a first time-variant update rate to produce a first updated probability model for coding the symbol for the subsequent syntax element of the sequence, and updating the second probability model using a second time-variant update rate to produce a second updated probability model for coding the symbol for the subsequent syntax element of the sequence. The first time-variant update rate is different from the second time-variant update rate.

An aspect of the teachings herein comprises an apparatus for entropy coding a sequence of syntax elements comprising a processor configured to execute any of the methods described herein.

As aspect of the teachings herein comprises an apparatus for entropy coding a sequence of syntax elements that includes a processor and memory storing instructions that, when executed by the processor, cause the processor to execute any of the methods described herein.

Variations in these aspects and other aspects of this disclosure are disclosed in the following detailed description of the implementations, the appended claims, and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Video compression schemes may include breaking respective images, or frames, into smaller portions, such as blocks, and generating an encoded bitstream using techniques to limit the information included for respective blocks thereof. The encoded bitstream can be decoded to re-create or reconstruct the source images from the limited information. The information may be limited by lossy coding, lossless coding, or some combination of lossy and lossless coding.

One type of lossless coding is entropy coding, where entropy is generally considered the degree of disorder or randomness in a system. Entropy coding compresses a sequence in an informationally efficient way. That is, a lower bound of the length of the compressed sequence is the entropy of the original sequence. An efficient algorithm for entropy coding desirably generates a code (e.g., in bits) whose length approaches the entropy. For a particular sequence of syntax elements, the entropy associated with the code may be defined as a function of the probability distribution of observations (e.g., symbols, values, outcomes, hypotheses, etc.) for the syntax elements over the sequence. Arithmetic coding can use the probability distribution to construct the code.

However, a codec does not receive a sequence together with the probability distribution. Instead, probability estimation may be used in video codecs to implement entropy coding. That is, the probability distribution of the observations may be estimated using one or more probability estimation models (also called probability models herein) that model the distribution occurring in an encoded bitstream so that the estimated probability distribution approaches the actual probability distribution. According to such techniques, entropy coding can reduce the number of bits required to represent the input data to close to a theoretical minimum (i.e., the lower bound).

In practice, the actual reduction in the number of bits required to represent video data can be a function of the accuracy of the probability model, the number of bits over which the coding is performed, and the computational accuracy of the (e.g., fixed-point) arithmetic used to perform the coding (also referred to as the resolution herein). The teachings herein improve the accuracy of the probability estimation by incorporating regularization into the update process for the probability model, incorporating a time-variant multi-hypothesis probability model into the update process for the probability model, or both. Use of the probability estimation described herein can result in more efficient entropy coding than existing techniques.

Further details of the improved estimation of the probability distribution and its use in entropy coding are described herein first with reference to a system in which the teachings may be incorporated.

Figure 1:
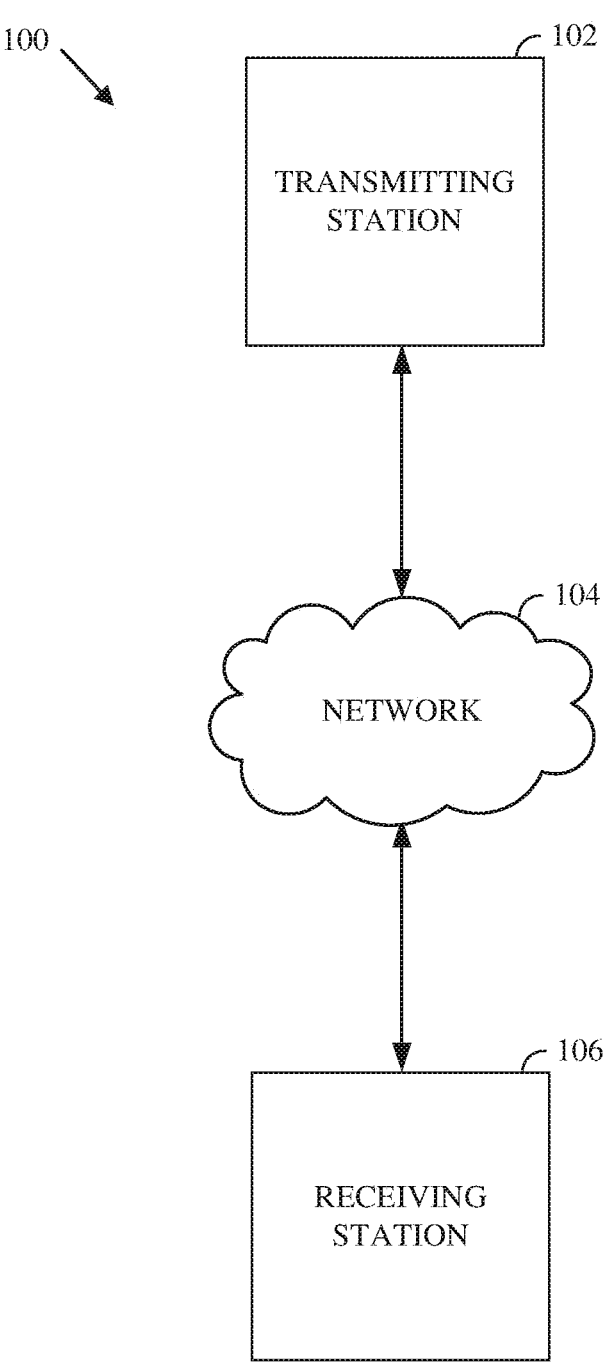
FIG. 1 is a schematic of an example of a video encoding and decoding system.

FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figures 2, 3:
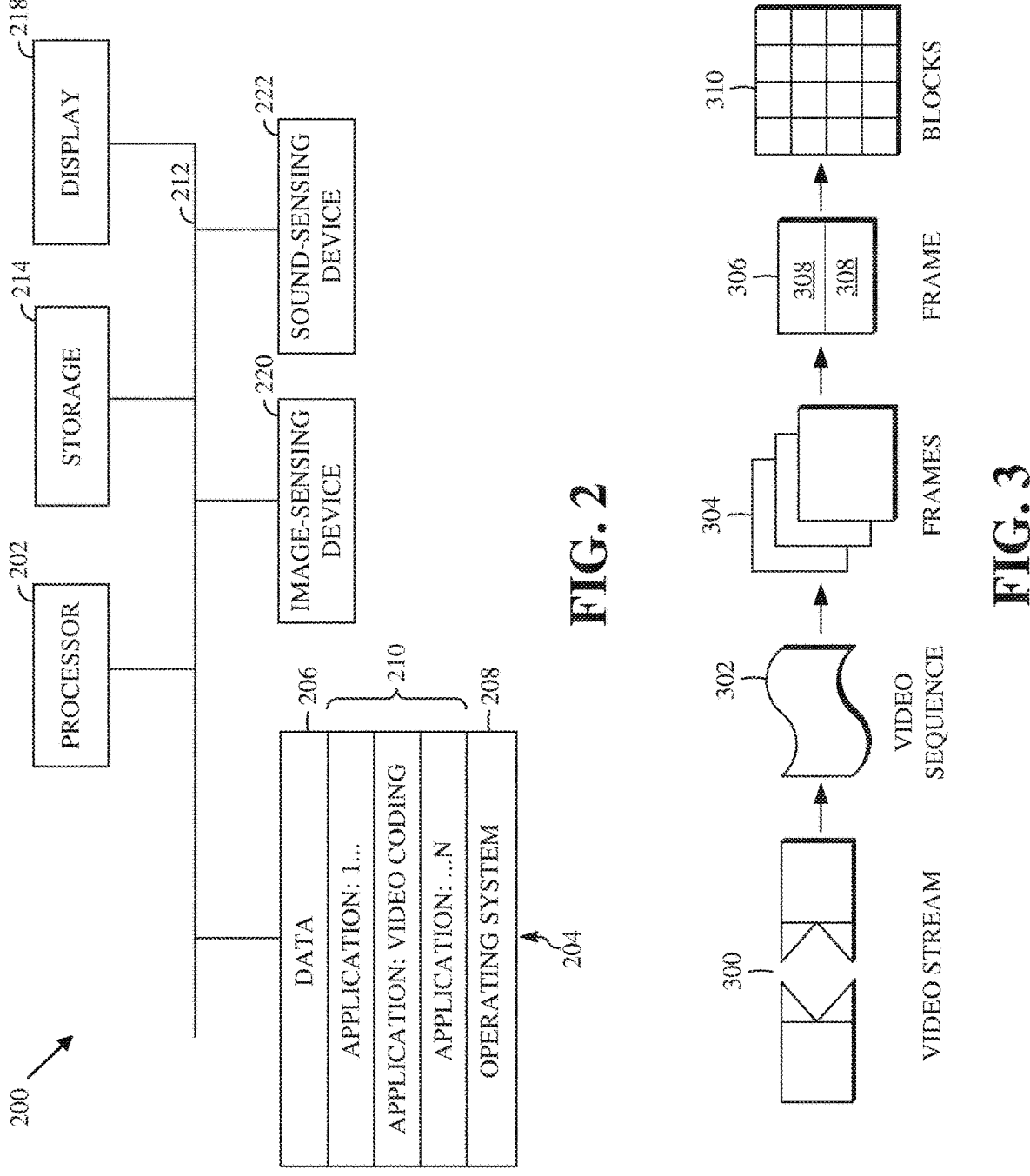
FIG. 2 is a block diagram of an example of a computing device that can implement a transmitting station or a receiving station.
FIG. 3 is a diagram of an example of a video stream to be encoded and subsequently decoded.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a video streaming protocol based on Hypertext Transfer Protocol-based (HTTP).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data. Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random-access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
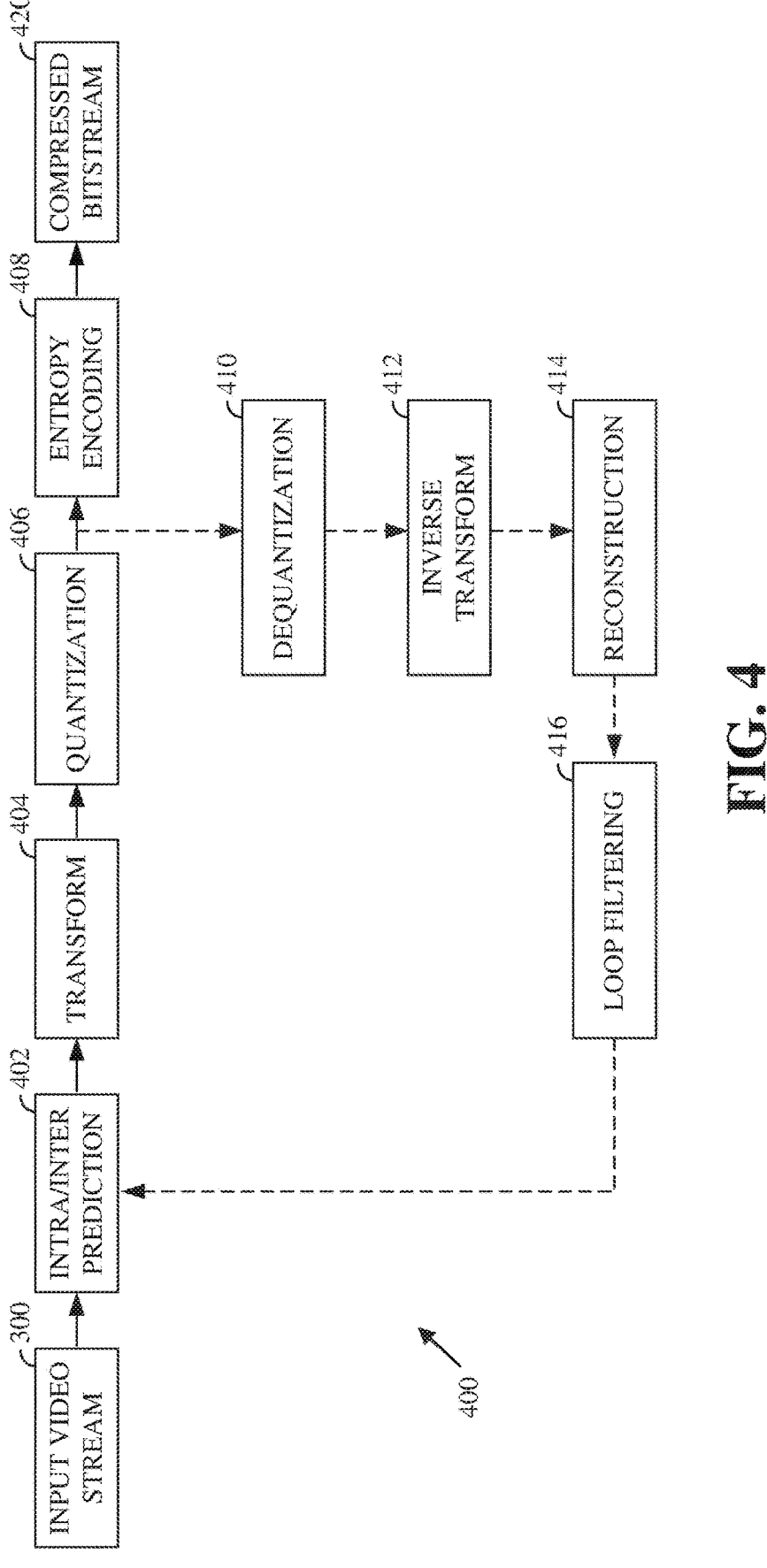
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
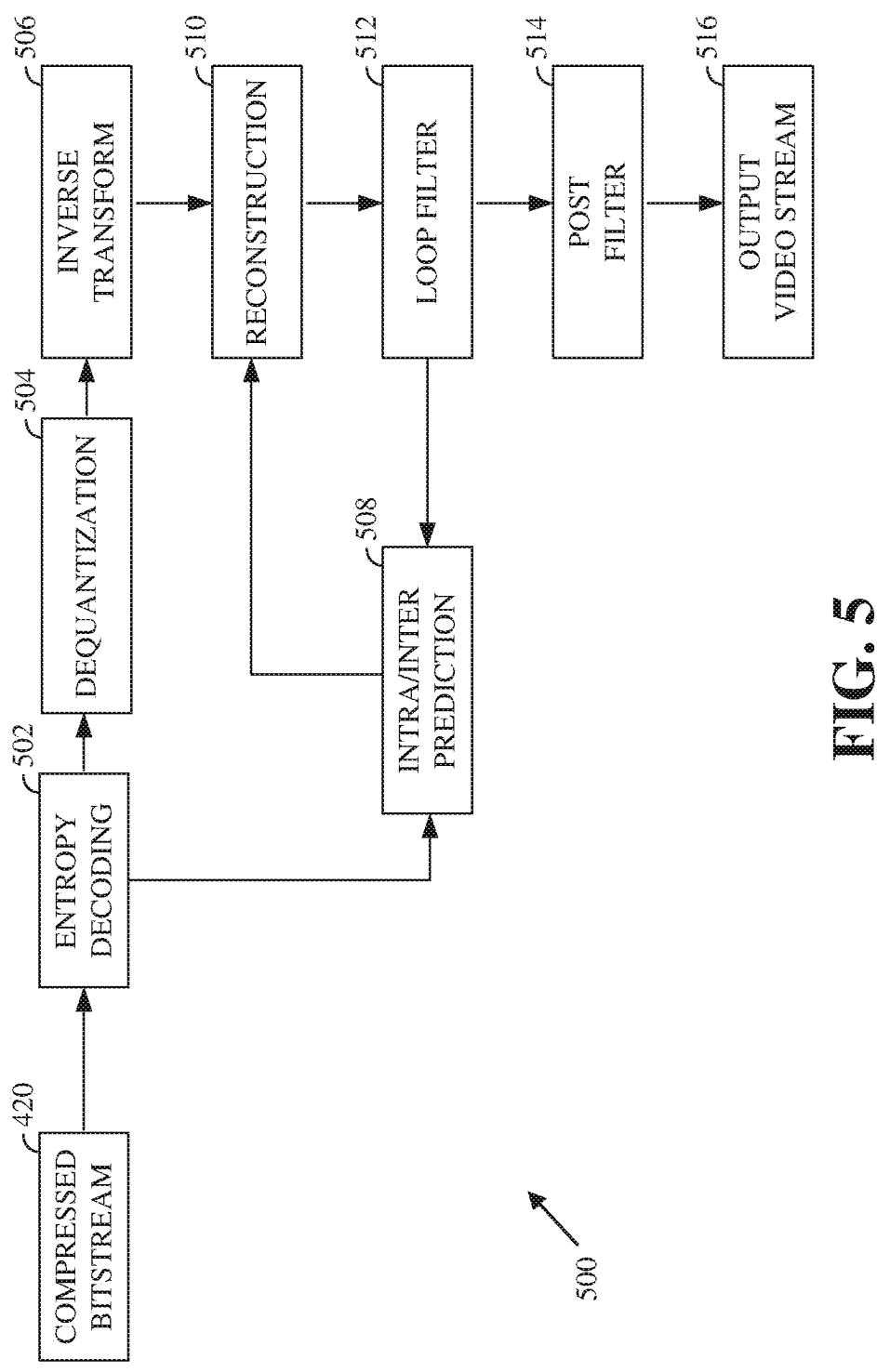
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

As can be discerned from the description of the encoder 400 and the decoder above, bits are generally used for one of two things in an encoded video bitstream: either content prediction (e.g., inter mode/motion vector coding, intra prediction mode coding, etc.) or residual or coefficient coding (e.g., transform coefficients). Encoders may use techniques to decrease the bits spent on representing this data. For example, a coefficient token tree (which may also be referred to as a binary token tree) may specify the scope of the value, with forward-adaptive probabilities for each branch in this token tree. The token base value is subtracted from the value to be coded to form a residual then the block is coded with fixed probabilities. A similar scheme with minor variations including backward-adaptivity is also possible. Adaptive techniques can alter the probability models as the video stream is being encoded to adapt to changing characteristics of the data. In any event, a decoder is informed of (or has available) the probability model used to encode an entropy-coded video bitstream so the decoder can decode the video bitstream.

That is, and as described initially above, a video codec may use arithmetic coding to materialize the entropy coding of syntax elements (such as the coding modes and residual coefficient data referenced above). The coding efficiency largely depends on the accuracy of the probability model. The probability model may be equivalently represented by either a probability mass function (PMF) or cumulative probability density function, also referred to as a cumulative distribution function (CDF) of the syntax element.

A desirable adaptive technique for updating a probability model may be implemented with an M-ary coding scheme, where a syntax element that has M possible outcomes, values, or observations can be directly coded using its probability model, without recourse to first binarizing the syntax element into a sequence of binary random variables. Provided an initial state of the probability for each outcome, the codec updates the probability model for each new observation.

Figure 6:
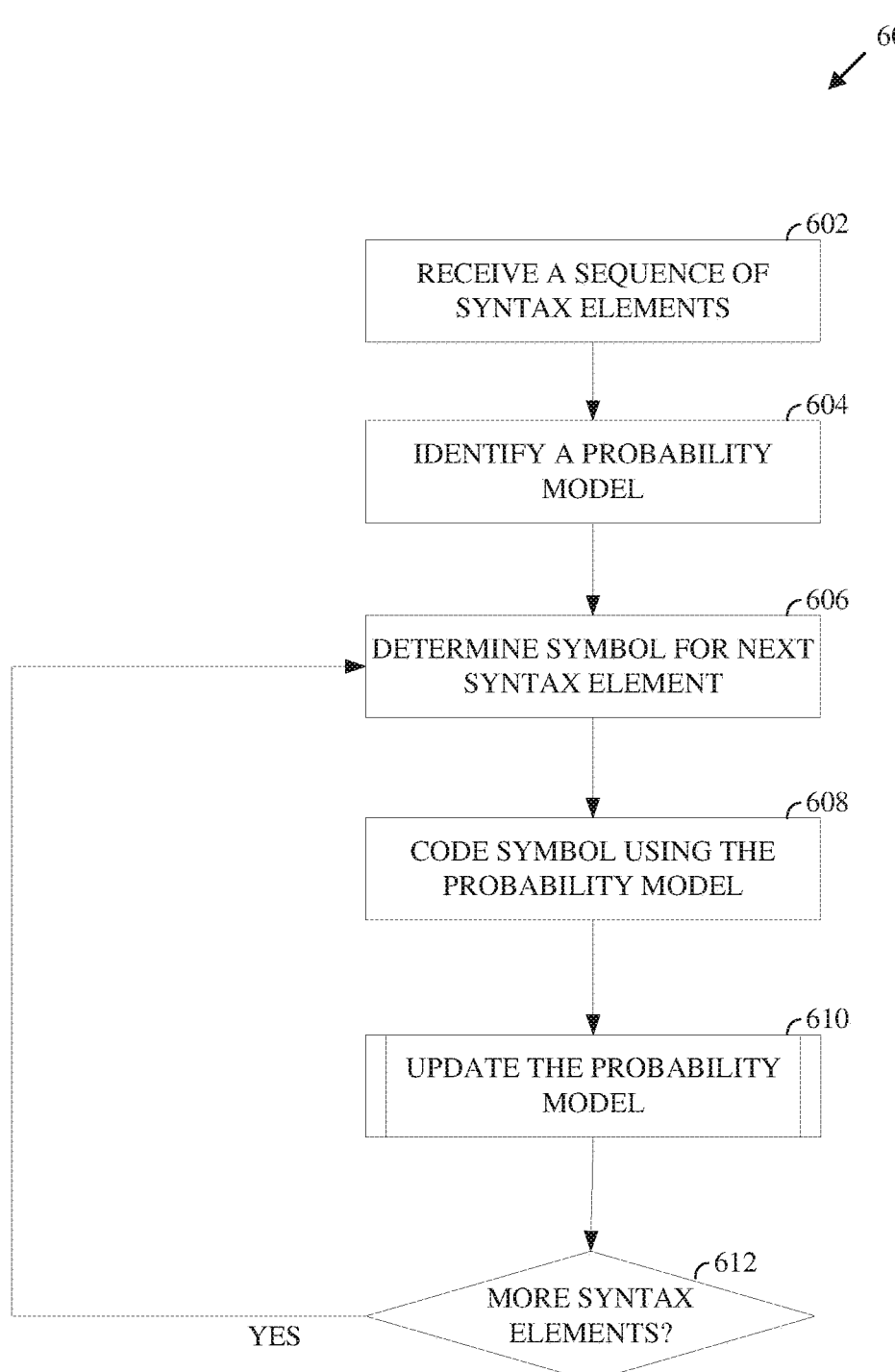
FIG. 6 is a flow chart of a method for entropy coding a sequence of syntax elements according to the teachings herein.

FIG. 6 is a flow chart of a method for entropy coding 600 a sequence of syntax elements according to the teachings herein. Entropy coding 600 may be performed at an entropy coding stage of an encoder, such as the entropy encoding stage 408 of the encoder 400, the entropy coding stage of a decoder, such as the entropy decoding stage 502 of the decoder 500, or the entropy coding stage of both an encoder and a decoder. While entropy coding 600 is shown as including steps arranged in a certain sequence, not all steps need to be performed, and the steps may be performed in a different sequence or be combined.

At 602, a sequence of syntax elements is received. Some examples of syntax elements and a sequence of syntax elements may be explained with reference to FIG. 7.

Figure 7:
FIG. 7 is a diagram illustrating some syntax elements associated with quantized transform coefficients according to implementations of this disclosure.
Figure 7:
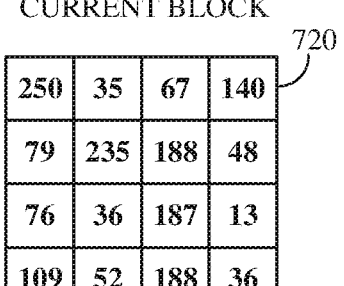
Figure 7:
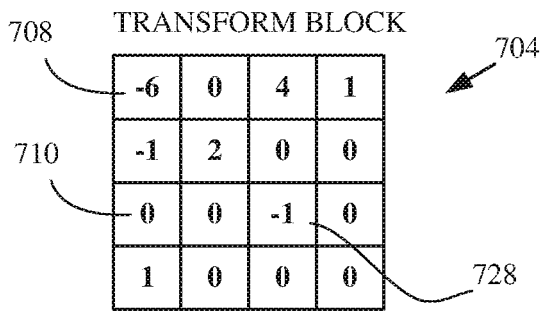
Figure 7:
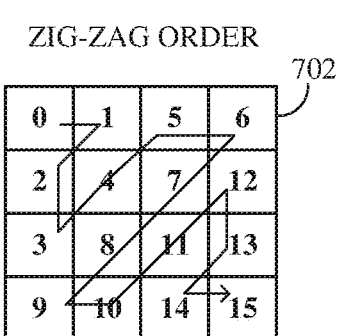
Figure 7:
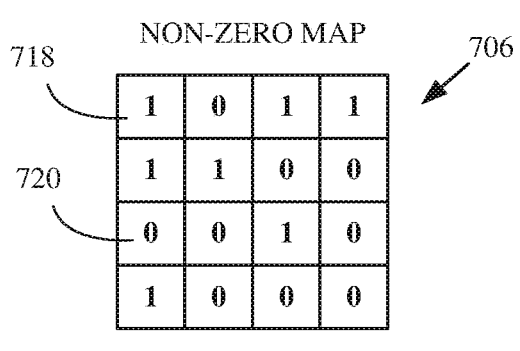
Figure 7:
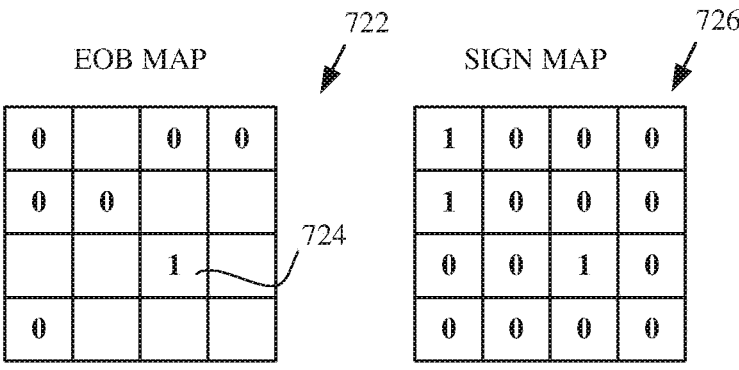

FIG. 7 is a diagram 700 illustrating syntax elements associated with coding transform coefficients. The diagram 700 depicts a current block 720, a scan order 702, a (e.g., quantized) transform block 704, a non-zero map 706, an end-of-block (EOB) map 722, and a sign map 726. The current block 720 is illustrated as a 4×4 block. However, any block size is possible. For example, the current block can have a size (i.e., dimensions) of 4×4 pixels, 8×8 pixels, 16×16 pixels, 32×32 pixels, or any other rectangular block size, including non-square dimensions. The current block 720 can be a block of a current frame. In another example, the current frame may be partitioned into segments (such as the segments 308 of FIG. 3), tiles, or the like, each including a collection of blocks, where the current block is a block of the partition.

The transform block 704 can be a block of a same or similar size to the size of the current block 720. The transform block 704 includes non-zero coefficients (e.g., a coefficient 708) and zero coefficients (e.g., a coefficient 710). As described above, the transform block 704 may include transform coefficients for the residual block corresponding to the current block 720. Also as described above, the transform coefficients are entropy coded, such as at the entropy coding stage 408 of FIG. 4, and as discussed in further detail below.

To encode a transform block, a video coding system may traverse the transform block in a scan order and encode (e.g., entropy encode) the transform coefficients as the transform coefficients are respectively traversed (i.e., visited). The scan order may depend upon the transform type or kernel used to generate the transform block or on some other variable associated with coding the current block and/or the transform block. The scan order may be a fixed scan order for all blocks. In the example shown, the scan order 702 is a zigzag scan order. Therein, the top left corner of the transform block (also known as the DC coefficient) is first traversed, the next coefficient in the scan order (i.e., the transform coefficient corresponding to the location labeled "1") is traversed, and so on. Regardless of the scan order, a one-dimensional structure (e.g., an array or sequence) of transform coefficients can result from the traversal of the two-dimensional transform block using the scan order.

Another set of syntax elements associated with coding a transform block may be described with reference to the non-zero map 706, which may be derived from the transform block 704. The non-zero map 706 indicates which transform coefficients of the transform block 704 are zero and which are non-zero. A non-zero coefficient and a zero coefficient can be indicated with values one (1) and zero (0), respectively, in the non-zero map 706. For example, the non-zero map 706 includes a non-zero 718 at Cartesian location (0, 0) corresponding to the coefficient 708 and a zero 720 at Cartesian location (2, 0) corresponding to the coefficient 710. The EOB map 722 may be derived from the non-zero map, such as the non-zero map 706, and the scan order, such as the scan order 702. An end-of-block map indicates whether a non-zero transform coefficient of transform block is the last non-zero coefficient with respect to the scan order. If a non-zero coefficient is not the last non-zero coefficient in the transform block, then it can be indicated with the binary bit zero (0) in the end-of-block map. If, on the other hand, a non-zero coefficient is the last non-zero coefficient in the transform block, then it can be indicated with the binary value one (1) in the end-of-block map. As shown in this example, as the transform coefficient corresponding to the scan location 11 (i.e., the last non-zero transform coefficient 728) is the last non-zero coefficient of the transform block 704, it is indicated with the EOB value 724 of one (1); all other non-zero transform coefficients are indicated with a zero.

Another set of syntax elements associated with coding a transform block may be described with reference to the sign map 726. A sign map indicates which non-zero transform coefficients of a transform block have positive values and which transform coefficients have negative values. The sign map 726 illustrates a sign map for the transform block 704. In the sign map, negative transform coefficients can be indicated with a 1 and positive transform coefficients are identified with a 0 (e.g., transform coefficients that are zero are considered positive).

The sequence of syntax elements for entropy coding received at 602 may comprise one or more arrays derived from respective transform blocks. For example, syntax elements comprising the index positions of last non-zero transform coefficients for respective transform blocks, such as from the EOB map 722, may be coded using the entropy coding techniques described herein, or by other lossless coding techniques. By coding the EOB in the scan order, any zeros in the array of transform coefficients after the EOB value 724 in the scan order may be ignored in the coding. For example, the 1D array corresponding to the transform block 704 has the entries [−6, 0, −1, 0, 2, 4, 1, 0, 0, 1, 0, −1, 0, 0, 0, 0]. The final four zeros in the sequence may be omitted from entropy coding. Further, syntax elements comprising the sequence of values of the sign map (e.g., in a scan order) may be coded using the entropy coding techniques described herein, but preferably are encoded as raw bits (e.g., bypassing entropy coding). By coding the sign map information, the sequence of syntax elements for entropy coding received at 602 may correspond to the absolute values of the magnitudes of the transform coefficients. For the transform block 704, the entries of the array would correspond to [6, 0, 1, 0, 2, 4, 1, 0, 0, 1, 0, 1].

In the examples described herein, the sequence of syntax elements for entropy coding received at 602 comprises an unsigned array of transform block magnitudes (e.g., transform coefficients, whether quantized or not) or their encoded representations from the bitstream. However, other syntax elements may be entropy coded according to the teachings herein.

At 604, entropy coding 600 includes identifying (e.g., selecting, determining) a probability model for entropy coding the sequence. The probability model may be identified based on the syntax elements. For example, a probability model used for entropy coding arrays of magnitudes of transform blocks may be different from a probability model used for entropy coding a sequence of other variables. A probability model used for entropy coding DC coefficients of arrays of magnitudes of transform blocks may be different from a probability model used for entropy coding the remaining transform coefficients of the arrays. A probability model may be a new probability model with initial values as described below or may be inherited from a reference frame or earlier blocks or sets of blocks from the current frame. The probability model is described in additional detail below.

Once the probability model is identified at 604, entropy coding 600 uses the probability model starting at 606 by determining an outcome or observation for the next syntax element. The next syntax element may be the first syntax element in the sequence to be coded. In an example of the teachings herein, the syntax elements may correspond to quantized transform coefficients, and the sequence may be processed in reverse scan order. In some implementations, the absolute values of the magnitudes fall within the range $[0, 2^{16}]$ because the magnitudes fall within the range $[-2^{15}, 2^{15}]$. The first observation of the transform coefficient array [6, 0, 1, 0, 2, 4, 1, 0, 0, 1, 0, 1], by example, is 1.

Once the observation is determined at 606, the observation is coded at 608 using the probability model. In some implementations of entropy coding, the observation is binarized before coding. In the implementations discussed herein, the probability model described above allows for entropy coding of the observation without binarization. To do so, the observation is generally represented by one or more symbol(s) or token(s) that represent ranges of values for the syntax element, context modeling, and arithmetic coding. Accordingly, determining an observation for the syntax element at 606 may more particularly include determining a symbol for the syntax element, and coding the observation using the probability model at 608 may more particularly include coding the symbol using the probability model.

Representing the observation by one or more symbol(s) includes using the observation to select the one or more symbol(s) from available symbols. The cardinality of available symbols, and hence their respective ranges, may take advantage of the fact that while the range of magnitudes is relatively wide ($[-2^{16}, 2^{16}]$ in this example), the observations for any particular frame or block often correspond to the integer values closest to 0. For example, a first symbol base range (BR) can correspond to four possible outcomes or observations for the absolute value of the magnitude of (e.g., quantized) transform coefficients, namely {0, 1, 2, >2}. The next following symbol may comprise one or more low range (LR) symbols, which each correspond to a residual value that is, e.g., a difference of the magnitude over the upper limit of the previous symbol. For example, a symbol LR1 may be further used for encoding observations having a lower limit value of 3 and corresponding to four possible outcomes for the residual value, namely {0, 1, 2, >2}. A symbol high range (HR) may be used for the coding of higher absolute values of the transform coefficients (e.g., up to $2^{16}$). Because of the characteristic clustering of the values about 0, the range of residual values over the upper limit of the previous symbol may be wider for the HR symbol.

Table 1 below shows an example of symbols and how the absolute value of the magnitude may be represented by the BR symbol, and optionally LR and HR symbols.

TABLE I

| Symbol | Transform Coefficient Value |
| --- | --- |
| BR | 0-2 |
| LR1 | 3-5 |
| LR2 | 6-8 |
| LR3 | 9-11 |
| LR4 | 12-14 |
| HR | $15\text{-}2^{16}$ |

For example, if these symbols were used for entropy coding a magnitude of 6, as in the example array above, the symbols BR, LR1, and LR2 would be sufficient to represent the magnitude. In this example, each of the BR and LR symbols correspond to two bits. However, the number of bits, and hence the ranges for each symbol can vary. For example, the BR symbol may correspond to two bits, while the LR symbols may correspond to three bits. Further, additional symbols or few symbols may be used (with the ranges adjusted accordingly). For example, the HR symbol may be further deconstructed so that the high-range values shown are parsed into smaller ranges of values. The symbols may be different and may depend on the resolution or other characteristics of the frames, images, or blocks being encoded and decoded.

As described initially, the probability model may be equivalently expressed by the PMF or the CDF of a variable. For example, an M-ary random variable has a PMF defined as follows:

$$\bar{P}_n = [p_1(n), p_2(n), ..., p_M(n)] \tag{1}$$

The variable has M possible outcomes for an observation at time n (e.g., the location in a sequence being coded). In this example, $M \in [2,16]$. Each of the probabilities is non-negative and their sum is 1.

The probability model of an M-ary coding scheme for the variable may be represented by the following CDF:

$$\bar{C}_n = [c_1(n), c_2(n), \ldots, c_{M-1}(n), 1] \tag{2}$$

The probability $c_k(n)$, also referred to as a cumulative probability herein, is the probability that the variable, evaluated at k, will take on a value less than or equal to k, where k is an integer such that $k \in \{1, 2, \ldots M\}$.

The cumulative probabilities of a probability model, when not inherited as described above, may be initialized with values dependent on the value M. For example, where a syntax element has two possible outcomes (e.g., binary 0 or 1), the values may be initialized to conform to an equal probability, e.g., $\overline{C}_n=[0.5,1]$.

The probability model comprising a unique CDF for each of the BR and LR (e.g., LR1-LR4) symbols, each CDF of which is conditioned on reference (e.g., previously-coded) coefficients. Context modeling for a respective symbol to be coded, also called context derivation, may be based on an expected correlation of the symbol to symbols representing the other observations of the syntax elements. For example, context modeling for the BR symbol may be conditioned on the previously coded coefficients of the current transform block, and optionally on one or more neighboring samples from other transform blocks within the current frame. Context modeling for each of the LR symbols may be conditioned on previously coded coefficients of neighboring samples. The neighboring samples may be determined based on the transform kernel or type—that is, the neighboring samples for one transform kernel, such as a two-dimensional (2D) transform kernel, may be different from the neighboring samples for another transform kernel, such as a one-dimensional (1D) transform kernel (e.g., a horizontal or vertical transform kernel).

In the arithmetic coding step, given a context, the symbol is coded by using the context together with the probability from the probability model associated with the symbol in an arithmetic coding engine. The cumulative probability in each entry of equation (2) above may be scaled by $2^{15}$ so that the calculations are done using integers (and not percentages). That is, the cumulative probability $c_k(n)$ is represented by 15-bit unsigned integers so that the arithmetic operations may be completed using integer values. The cumulative probabilities may be scaled by other factors for a different integer resolution in the calculations.

Further examples of context modeling and arithmetic coding using context modeling may be obtained by reference to J. Han et al., "A Technical Overview of AV1", arXiv:2008.06091v2 [eess.IV] (Feb. 8, 2021), Section VI of which is directed to the entropy coding system of the AV1 codec and which is incorporated herein in its entirety by reference, and to I. H. Witten, et al., "Arithmetic coding for data compression", Communications of the ACM, vol. 30, no. 6, pp. 520-540 (1987), which is incorporated herein in its entirety by reference.

After the observation is coded at 608 using the probability model, the probability model is updated at 610. Each CDF for a symbol may be updated according to the following equations.

$$c_m(n) = \begin{cases} c_m(n-1) \cdot (1-\alpha), & m < k \\ c_m(n-1) + \alpha \cdot (1-c_m(n-1)), & m \geq k \end{cases} \qquad (3)$$

In equation (3), k is the index for the new observation in the order of the sequence being encoded, m is the index for the cumulative probability within the CDF of a symbol, and a is the model update rate, also referred to herein as the update rate.

According to some implementations of updating a probability model, a fixed update rate may be used. One known example is 0.95. A fixed update rate, while simple to implement, does not address time variance in the probability distribution. More specifically, a fixed update rate does not address the desirability of providing for a higher adaptation rate at the beginning of use of the probability model (e.g., at the beginning of a frame or some portion of a frame). An adaptation rate refers to how quickly the model updates a probability for an observation. Instead of a fixed update rate, the update rate may be formulated to provide a higher adaptation rate at the beginning. The update rate may do this by weighting the probability update for a new symbol differently at the beginning of use of the probability model as compared to later in use. The update rate may consider how many symbols are coded before and with the coding of the current observation. The update rate may be a deterministic update rate that provides the higher adaptation rate at the beginning than after a defined time has passed. One time-variant update rate for a probability model (e.g., for a respective symbol) that may be used is shown below.

$$\alpha = 1/2^{3+I(count>15)+I(count>30)+min(log_2(M),2)} \qquad (4)$$

In equation (4), count refers to the number (e.g., cardinality) of symbols coded through the current observation. 1 (comparison) is a function that returns 1 if comparison is true (that is, if count>15 and/or count>30) and otherwise returns 0 (i.e., if the comparison is not true). Equation (4) achieves the functionality of providing the higher adaptation rate at the beginning while slowing down and/or stabilizing as more observations are received. The threshold values used for comparison to count may vary, and there may be more or fewer comparisons.

While a time-variant update rate, such as the example of equation (3), provides a more efficient compression in entropy coding than a fixed rate, it has some drawbacks. For example, a random variable that has a strongly-biased probability distribution may result in the probability associated with a low likelihood event to approach zero. More specifically, the probability may go below the probability resolution, which is $\frac{1}{2}^{15}$ in the examples described herein. Supplied to the arithmetic coding process, the corresponding CDF interval is 0 (e.g., $c_{k-1}(n)=c_k(n)$). An attempt to code with zero probability in theory leads to infinite codeword length and would likely corrupt the arithmetic coding. This is because a smaller probability typically produces a longer codeword than a larger probability. To avoid coding using 0, a preset minimum probability $p_{min}$ may be used instead of the calculated probability used for the update of the CDF. That is, the arithmetic coding selects the greater of the determined probability value or probability $p_{min}$, but the CDF remains unchanged.

While this solution addresses the identified problem in the arithmetic coding process, problems can arise because the CDF remains unchanged. In practice, near-zero probability events (e.g., an observation with a very low probability) may result because the probability distribution update process overly biases towards other most likely events. When a near-zero probability event happens, it is a good indicator that the current probability distribution is overly biased. Addressing this bias may be achieved by increasing the probabilities of these near-zero probability events within the probability model. In some implementations of entropy coding 600 herein, updating the probability model at 610 includes regularizing the probability model that eliminates a zero-probability event in the CDF itself and eliminates the need to provide the preset minimum probability $p_{min}$ for the arithmetic coding.

An example of regularizing the probability model 800 may be described with reference to the method of FIG. 8. In general, at the end of each update of a probability model, if there is a probability that goes below a minimum value V, a uniform distribution can be applied as a regularization term to adjust all cumulative probabilities so that, for all values m, $c_{m-1}(n)+c_m(n)$. The minimum value V may correspond to the preset minimum probability $p_{min}$. The minimum value may correspond to the sample space M of the random variable. For example, $V=2^{15}/M$ for an M-ary random variable.

Regularizing the probability model 800 includes monitoring probability values of the PMF. Monitoring the probability values may be started at 802 by determining a current probability value $p_m(n)$. Determining the current probability value may be done during or after the update step by comparing the current cumulative probability $c_m(n)$ to the previous cumulative probability $c_{m-1}(n)$. That is, for example, a difference may be calculated as $p_m(n)=c_m(n)-c_{m-1}(n)$. At 804, the current probability value $p_m(n)$ may be stored. Alternatively, the current probability value $p_m(n)$ may be stored at 804 only if it is the lowest probability value yet to be stored. For example, current probability value $p_m(n)$ may be compared to stored probability value (e.g., initialized at 1) and be stored only if it is below the currently stored value. At 806, a query to see whether there are more probability values to monitor may be done. The check may be to see if m<M is true or false in some implementations. If there are more probability values to monitor in response to the query at 806, regularizing the probability model 800 returns to determine the next probability value at 802.

If there are no further probability values to monitor at 806, regularizing the probability model 800 advances to 808 to determine whether any probability value is below the threshold V. This may be done by comparing the probability value(s) stored at 804 to the threshold V. If no probability value is below the threshold V, the method ends. Otherwise, the probability model is regularized at 810.

As referenced above, regularizing the probability model at 810 includes applying a uniform distribution as a regularization term to adjust the updated cumulative probabilities. The uniform distribution may be a uniform CDF for the M-ary random variable represented by:

$$U_m = \frac{m}{M} = \bar{C}^u = [c_1^u, c_2^u, \ldots, c_{M-1}^u, 1] = \left[\frac{1}{M}, \frac{2}{M}, \ldots, \frac{M-1}{M}, 1\right] \quad (5)$$

The uniform CDF $U_m$ may be normalized by the scaling factor, in this example, $2^{15}$ $$(\text{e.g., } U_m = \frac{2^{15}}{M}m)$$

so that integer math may be used for the regularization, but this is not required.

The uniform CDF may be applied to regulate the minimum probability in the current cumulative distribution to be at or above V when that minimum probability is less than V. The minimum probability may be the lowest probability value stored at 804. Assuming the minimum probability is $p_m$ and $p_m<V$, a linear combination of the current CDF (e.g., an updated CDF) and the uniform CDF can be used to raise $p_m$ to V. Thus, the following equality can be formed:

$$p_m + \alpha\frac{1}{M} = (1+\alpha)V \quad (6)$$

The new value $\hat{p}_m$ for $p_m$ may be solved for as follows:

$$\hat{p}_m = V = \frac{p_m + \alpha\frac{1}{M}}{1+\alpha} \quad (7)$$

Solving for a results in:

$$\alpha = \frac{V - p_m}{\frac{1}{M} - V} \quad (8)$$

To further simplify the regularization, the update rate a may be approximated as M. V. This allows the updated probability value $\hat{p}_m$ to minimally exceed V. Thus, the regularization process used at 810 to generate the new probability model $\hat{C}_n$ (i.e., to adjust all cumulative probabilities of the current probability model $\underline{C}_n$ simultaneously after the update) may be represented as:

$$\hat{C}_n = \frac{\bar{C}_n + \alpha U_m}{1+\alpha} \quad (9)$$

Accordingly, the M-ary random variable may be represented as $U\_M=[1/M, 2/M, \ldots, (M-1)/M, 1]$, $\alpha$ can be expressed as $alpha=(V-p\_m)/(1/M-V)$ where $p\_m$ is the lowest probability value, and the new probability model can be expressed as $C-bar\_n=(C\_n+alpha*U\_M)/(1+alpha)$.

Figure 8:
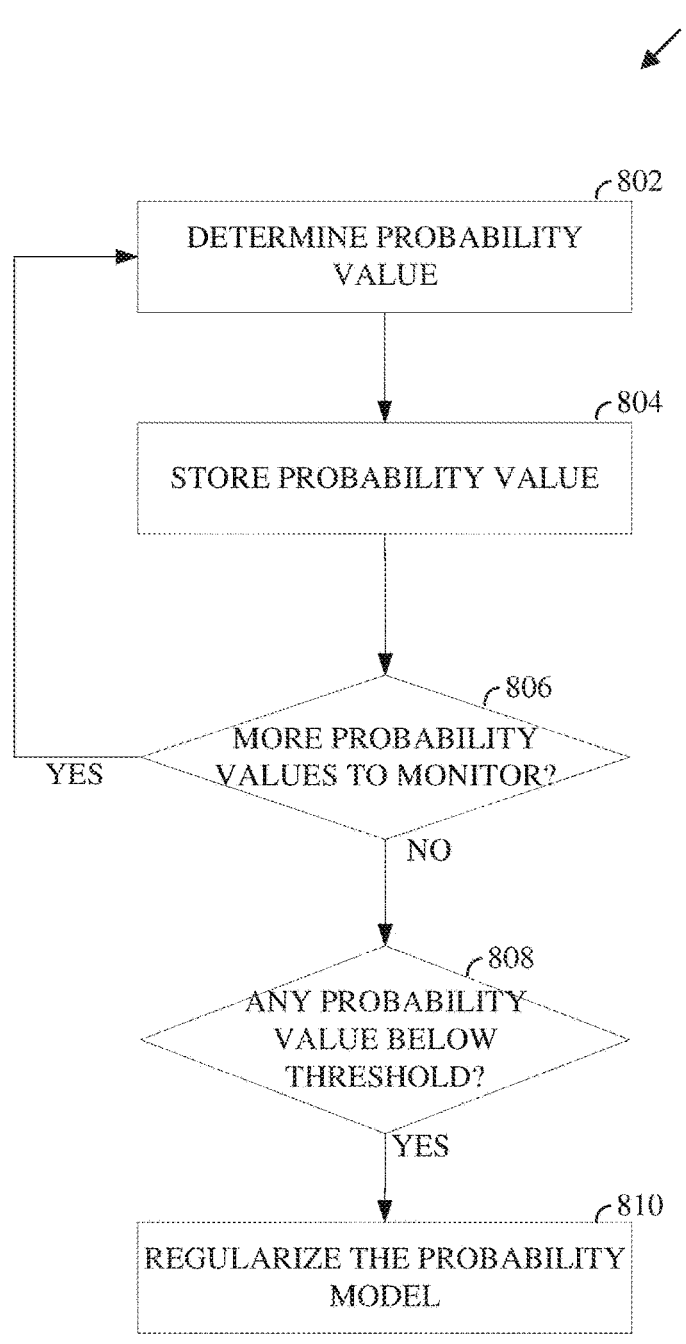
FIG. 8 is a flow chart of a method for regularizing a probability model according to the teachings herein.

FIG. 8 is one example of regularizing the probability model while updating the probability model at 610 to eliminate a zero-probability event in the CDF itself. As mentioned above, this regularizing eliminates the need to provide a preset minimum probability $p_{min}$ for the subsequent arithmetic coding process. Stated differently entropy coding may be performed in the absence of a minimum probability value because no probability of the model after updating has a value low enough that it is effectively 0 (e.g., its value is lower than the resolution used for the calculations.

Another example of updating the probability model at 610 includes using a constant term (i.e., a regularization term) in the probability model update process itself to approximate the regularization described with respect to FIG. 8. In brief, updating the probability model includes adding to or subtracting from each probability (e.g., of the CDF) a regularization term. An example is shown below, which may be used instead of equation (3) previously described.

$$c_m(n) = \begin{cases} c_m(n-1)\cdot(1-\alpha)+\epsilon, & m < k \\ c_m(n-1)+\alpha\cdot(1-c_m(n-1))-\epsilon, & m \geq k \end{cases} \quad (10)$$

The regularization term $\epsilon$ of equation (10) can depend on the cardinality of the random variable space M. In an example, the regularization term $\epsilon$ can depend solely on the cardinality of the random variable space M. In an example, the regularization term $\epsilon$ can be given by $$\epsilon = \gamma\frac{1}{M} \quad (11)$$

In equation (11), $\gamma$ is a constant that is used to scale the strength of the regularization effect. Thus, $\gamma$ can be referred to as a regularization strength scaling factor. A value for $\gamma$ can be empirically derived. The value for $\gamma$ may be preset to a positive number that is far less than 1 (i.e., $\gamma<<1$). As it may be preferable to perform integer arithmetic, the regularization term $\epsilon$ may be normalized by the scaling factor described above (i.e., $2^{15}$). As such, the regularization term $\epsilon$ can be given by:

$$\epsilon = \gamma \frac{2^{15}}{M} \qquad (12)$$

Adding the regularization term $\epsilon$ in the probability model update process itself, as shown in equation (10), can reduce the latency in the arithmetic coding pipeline and can minimize the computational demand while largely maintaining compression efficiency as compared to the regularizing the probability model 800 of FIG. 8.

Regularizing the probability model is optional. That is, regularizing the probability model as described with respect to FIG. 8 or as described with respect to equation (10) may be omitted while updating the probability model at 610 in some implementations of the teachings herein. Whether the probability model is regularized or not, entropy coding 600 may continue after updating the probability model by checking for more syntax elements for coding at 612 (e.g., after coding each symbol of the current observation according to the teachings herein). If there are no further syntax elements, entropy coding 600 ends for the current sequence of syntax elements.

Entropy coding 600 may be used for both entropy encoding and entropy decoding. The description above uses an example where the sequence of syntax elements comprises the transform coefficients for encoding for simplicity of explanation. For decoding, the sequence of syntax elements may include codewords (e.g., sequences of bits) that represent the encoded variables, such as EOB positions, quantized coefficients, etc.

The update rate described above with regards to updating the probability model at 610 is a time-variant update rate used with the CDF associated with one M-ary random variable. This probability model $\overline{C}_n$ benefits from the time-variant update rate because it is an adaptive rate approach where the update rate is higher when the amount of the observed data is small and is lower when more data are observed over time.

Another approach to entropy coding is to use multi-hypothesis estimation, in which each random variable maintains two or more probability tables of different fixed update rates, i.e., hypotheses. The final probability model for entropy coding comprises a linear combination of the respective hypotheses. While this approach improves efficiency over using a fixed update rate with a single probability model, the time-variant update rate is more flexible and hence can improve coding efficiency. This multi-hypothesis estimation may be improved by maintaining two probability models (e.g., two CDFs) for each random variable, in which each model uses a different time-variant update rate.

To implement such a solution, for example, entropy coding 600 may identify each of two probability models as 604. Each probability model may comprise a respective CDF, such as the following two CDFs:

$$\overline{C1}_n = [c_1(n), c_2(n), \ldots , c_{M-1}(n), 1] \qquad (10)$$

$$\overline{C2}_n = [c_1(n), c_2(n), \ldots , c_{M-1}(n), 1] \qquad (11)$$

At the start of a new sequence (e.g., at the start of a new frame), the two probability models may have the same values. Less likely but possibly, the two probability models may be inherited (e.g., from a reference frame) with different values. For example, an identification of a reference frame having a stored probability table may be made in the header of the current frame being coded.

At 606, the observation may be used to generate a respective hypothesis (e.g., the cumulative probability) using each of the probability models. Coding the observation using the probability models would use, for a respective cumulative probability, a linear combination of the two hypotheses as input to the arithmetic coding. For example, assuming a first update rate used with $\overline{C1}_n$ is $\alpha 1$, a second update rate used with $\overline{C2}_n$ is $\alpha 2$, $c_m(n)$ of $\underline{C1}_n$ is represented by $c_m(n,\alpha 1)$, and $c_m(n)$ of $\underline{C2}_n$ is represented by $c_m(n,\alpha 1)$, the linear combination to produce the cumulative probability $c_m(n)$ for use in arithmetic coding at 608 is:

$$c_m(n) = \beta c_m(n, \alpha 1) + (1 - \beta)c_m(n, \alpha 2) \qquad (12)$$

In equation (12), $\beta \in (0,1)$. The actual value used for $\beta$ may be determined by experimentation. In an example, $\beta=0.5$.

At 610, each probability model is separately updated using their respective time-variant update rates $\alpha 1$ and $\alpha 2$. The time-variant update rates $\alpha 1$ and $\alpha 2$ may each incorporate a function that has a higher adaptation rate at the beginning such as described with regards to updating the probability model at 610, so long as the functions are different. In some implementations, the functions are count-based functions modified based on equation (4). For example, the time-variant update rates may be used as follows:

$$\alpha 1 = 1/2^{4+I(count>7)+I(count>15)+min(log_2(M),2)} \qquad (13)$$

$$\alpha 2 = 1/2^{2+I(count>7)+I(count>15)+min(log_2(M),2)} \qquad (14)$$

In this example, each of the time-variant update rates $\alpha 1$ and $\alpha 2$ is represented by a step function that determines a higher update rate when the number (e.g., cardinality) of symbols coded through the current observation (i.e., the value of count) is low and results in a lower update rate as the value of count increases above each comparison value, in this example values of 7 and 15. As can be seen from the comparison values, the time-variant update rates $\alpha 1$ and $\alpha 2$ change (i.e., step down) on the same counts. The time-variant update rate $\alpha 2$ begins and finishes at a higher update rate than the time-variant update rate $\alpha 1$.

This time-variant multi-hypothesis probability model update may be combined with regularizing the probability model. In this combination, one or both probability models $\underline{C1}_n$ and $\underline{C2}_n$ may be separately regularized according to one of the techniques described above while updating the model to eliminate zero (or near-zero) probabilities from the cumulative probabilities.

For simplicity of explanation, the techniques herein are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law to encompass all such modifications and equivalent arrangements.

What is claimed is:

1. A device for entropy coding a sequence of syntax elements, comprising:
   a processor configured to:
      receive the sequence of syntax elements;
      determine a symbol for a syntax element of the sequence;
      entropy code, using arithmetic coding, the symbol using a probability model; and
      update the probability model using a time-variant update rate to produce an updated probability model, wherein to update the probability model includes to regularize one or more probability values so no probability of the updated probability model is below a defined minimum resolution, wherein
         the probability model comprises a cumulative distribution function of an M-ary random variable,
         M is a positive integer that represents a cardinality of possible observations for a respective syntax element of the sequence of syntax elements, and
         to regularize the one or more probability values comprises to monitor probability values of the updated probability model to determine if any probability value is below a threshold V, where V is a function of M, wherein when a probability value p_m is determined to be below the threshold V, a uniform cumulative distribution function for the M-ary random variable is applied to adjust the updated probability model.

2. The device of claim 1, wherein to regularize one or more probability values modifies every probability of the updated probability model after performing an update step on the probability model.

3. The device of claim 2, wherein to regularize one or more probability values uses a lowest probability of the updated probability model as input.

4. The device of claim 1, wherein the defined minimum resolution is 1 divided by M.

5. The device of claim 1, wherein to regularize one or more probability values modifies every probability of the probability model while updating the probability model using the time-variant update rate.

6. The device of claim 5, wherein the time-variant update rate includes a regularization term added to or subtracted each probability of the probability model.

7. The device of claim 1, wherein:

the probability model is a cumulative distribution model (CDF), and to regularize one or more probability values comprises to add to or to subtract from each probability of the CDF a regularization term.

8. The device of claim 1, wherein to entropy code the symbol comprises to entropy code the symbol without checking for a minimum probability value.

9. The device of claim 1, wherein the sequence of syntax elements comprises encoded transform coefficients, and to entropy code the symbol comprises to entropy decode a transform coefficient.

10. The device of claim 1, wherein the sequence of syntax elements comprises transform coefficients, and to entropy code the symbol comprises to entropy encode a transform coefficient.

11. The device of claim 1, wherein:

the probability model comprises a first probability model and a second probability model;

to entropy code the symbol using a probability model comprises to code the symbol using a linear combination of the first probability model and the second probability model;

to update the probability model comprises to:

update the first probability model using a first time-variant update rate to produce a first updated probability model for coding an observation for a subsequent syntax element of the sequence; and update the second probability model using a second time-variant update rate to produce a second updated probability model for coding an observation for a subsequent syntax element of the sequence, wherein the first time-variant update rate is different from the second time-variant update rate.

12. A method for entropy coding a sequence of syntax elements, comprising:

receiving the sequence of syntax elements;

determining a symbol for a syntax element of the sequence;

entropy coding, using arithmetic coding, the symbol using a probability model; and updating the probability model using a time-variant update rate to produce an updated probability model, wherein updating the probability model includes regularizing one or more probability values so no probability of the updated probability model is below a defined minimum resolution, wherein the probability model comprises a cumulative distribution function of an M-ary random variable, M is a positive integer that represents a cardinality of possible observations for a respective syntax element of the sequence of syntax elements, and regularizing the one or more probability values comprises monitoring probability values of the updated probability model to determine if any probability value is below a threshold V, where V is a function of M, wherein when a probability value p_m is determined to be below the threshold V, a uniform cumulative distribution function for the M-ary random variable is applied to adjust the updated probability model.

13. The method of claim 12, wherein regularizing one or more probability values modifies every probability of the updated probability model after performing an update step on the probability model.

14. The method of claim 12, wherein regularizing one or more probability values modifies every probability of the probability model while updating the probability model using the time-variant update rate.

15. The method of claim 12, wherein entropy coding the symbol comprises entropy coding the symbol without checking for a minimum probability value.

16. The method of claim 12, wherein one of:

the sequence of syntax elements comprises encoded transform coefficients, and entropy coding the symbol comprises entropy decoding a transform coefficient; or the sequence of syntax elements comprises transform coefficients, and entropy coding the symbol comprises entropy encoding a transform coefficient.

17. The method of claim 12, wherein:

the probability model comprises a first probability model and a second probability model;

entropy coding the symbol using a probability model comprises coding the symbol using a linear combination of the first probability model and the second probability model;

updating the probability model comprises:

updating the first probability model using a first time-variant update rate to produce a first updated probability model for coding an observation for a subsequent syntax element of the sequence; and updating the second probability model using a second time-variant update rate to produce a second updated probability model for coding an observation for a subsequent syntax element of the sequence, wherein the first time-variant update rate is different from the second time-variant update rate.

18. The device of claim 1, wherein the uniform cumulative distribution function for the M-ary random variable is represented by U_M=[1/M, 2/M, . . . , (M−1)/M, 1], and wherein to adjust the updated probability model comprises to:

compute a factor according alpha=(V−p_m)/(1/M−V), where p_m is a lowest probability value;

generate a regularized probability model according to C-bar_n=(C_n+alpha*U_M)/(1+alpha), where C_n is the updated probability model.

19. The method of claim 12, wherein the uniform cumulative distribution function for the M-ary random variable is represented by U_M=[1/M, 2/M, . . . , (M−1)/M, 1], and wherein adjusting the updated probability model comprises:

computing a factor according alpha=(V−p_m)/(1/M−V), where p_m is a lowest probability value;

generating a regularized probability model according to C-bar_n=(C_n+alpha*U_M)/(1+alpha), where C_n is the updated probability model.

* * * * *